(12) United States Patent
Okada et al.

(10) Patent No.: US 6,880,330 B2
(45) Date of Patent: Apr. 19, 2005

(54) TORQUE CONVERTER

(75) Inventors: Katsuhiko Okada, Shizuoka (JP); Toshiaki Noda, Kanagawa (JP); Keichi Tatewaki, Shizuoka (JP)

(73) Assignees: Jatco Ltd, Fuji (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/326,139

(22) Filed: Dec. 23, 2002

(65) Prior Publication Data

US 2003/0115862 A1 Jun. 26, 2003

(30) Foreign Application Priority Data

Dec. 26, 2001 (JP) ........................................ 2001-395185

(51) Int. Cl.[7] ............................................. F16D 33/00
(52) U.S. Cl. ........................................... 60/362; 60/367
(58) Field of Search .......................... 60/362, 364, 366, 60/367, 361, 330, 345

(56) References Cited

U.S. PATENT DOCUMENTS

| 4,044,556 A | * | 8/1977 | Kuramochi et al. ........... 60/361 |
| 4,186,557 A | * | 2/1980 | Arai et al. ..................... 60/367 |
| 4,866,935 A | | 9/1989 | Hayabuchi et al. |
| 5,058,027 A | * | 10/1991 | Becraft ........................ 60/330 |
| 5,241,820 A | * | 9/1993 | Fukunaga et al. ............. 60/361 |
| 5,884,535 A | | 3/1999 | Fukunaga |

FOREIGN PATENT DOCUMENTS

JP  11-63149 A  3/1999

* cited by examiner

Primary Examiner—F. Daniel Lopez
Assistant Examiner—Michael Leslie
(74) Attorney, Agent, or Firm—Foley & Lardner LLP

(57) ABSTRACT

A torque converter defines an ellipticity lower than or equal to 0.23 which is an outermost length of the torque converter in an axial direction, divided by an outermost diameter of the torque converter in a radial direction. The torque converter includes: a pump impeller connecting to an input shaft; a turbine runner opposed to the pump impeller and connecting to an output shaft; and a stator disposed between an inlet of the pump impeller and an outlet of the turbine runner, by way of a one way clutch which allows a one way rotation. The torque converter transmits a power by circulating a fluid through the pump impeller, the turbine runner and the stator. A first area ratio A is: $0.23 \leq A \leq 0.45$, A second area ratio B is: $0.23 \leq B \leq 0.45$, and A third area ratio C is: $0.15 \leq C < 0.23$.

20 Claims, 4 Drawing Sheets

PRIOR ART
(SMALL ELLIPTICITY :
SMALLER THAN
OR EQUAL TO 0.23)

EMBODIMENT OF
THE PRESENT INVENTION

THIRD AREA RATIO C

FIRST AREA RATIO A (STATOR AREA RATIO),
SECOND AREA RATIO B (STATOR AREA RATIO)

TORQUE CONVERTER

BACKGROUND OF THE INVENTION

1. Field of the Invention

The present invention relates to a torque converter used for a power transmission of a vehicle and the like.

2. Description of the Related Art

Conventionally, a torque converter is widely used in such a manner as to be disposed between an engine and a transmission. The above torque converter is of a 3-element type, namely, including a pump impeller, a turbine runner and a stator. More specifically, the above torque converter has a fluid pass construction including an inlet of the pump impeller, an outlet of the pump impeller, an inlet of the turbine runner, an outlet of the turbine runner, an inlet of the stator, and an outlet of the stator. The inlets and the outlets of each of the three elements have fluid pass areas that are substantially common. The fluid pass area is about 23% of an area of a circle defined by an outermost diameter (nominal diameter) of the torque converter.

The above torque converter can absorb and amplify a torque. The thus absorbed torque is commensurate with a work done by a fluid flowing in the fluid pass in the pump impeller. As a criteria, the thus absorbed torque is referred to as a torque capacity. More specifically, a torque capacity factor is defined as an input torque divided by a second power of an input speed $\{=\text{input torque}/(\text{input speed})^2\}$. The torque capacity smaller than its proper value for an engine torque may cause a high engine speed, resulting in a heavy fuel consumption. On the other hand, the torque capacity greater than its proper value for the engine torque may cause a heavy load to the engine. In sum, it is important to provide the torque capacity that is proper for the engine.

Having the fluid pass areas that are substantially "common" among the inlet inlets and the outlets of each of the three elements, the above conventional torque converter is likely to limit its torque capacity. In other words, the torque capacity has its upper limit. Thereby, the thus limited torque capacity cannot be applied to the engine that has high torque. Use of the torque converter having a low torque capacity for the high torque engine, however, may be responsible for the heavy fuel consumption.

Due to the substantially "common" fluid pass areas, enlarging the outermost diameter (nominal diameter) for securing the required torque capacity may involve increased weight, resulting in the heavy fuel consumption and higher cost.

Japanese Patent Unexamined Publication No. Heisei 11 (1999)-063149 (JP 11063149) discloses a torque converter having the following construction for securing the torque capacity factor.

At first, a first area ratio A, a second area ratio B and a third area ratio C are respectively defined as follows. (A) The first area ratio A is an area of an outlet of a turbine runner, divided by an area of a circle defined by an outermost diameter D; the first area ratio A is also an area of an inlet of a stator, divided by the area of the circle defined by the outermost diameter D. (B) The second area ratio B is an area of an outlet of the stator, divided by the area of the circle defined by the outermost diameter D; the second area ratio B is also an area of an inlet of a pump impeller, divided by the area of the circle defined by the outermost diameter D. (C) The third area ratio C is an area of an outlet of the pump impeller, divided by the area of the circle defined by the outermost diameter; the third area ratio C is also an area of an inlet of the turbine runner, divided by the area of the circle defined by the outermost diameter D.

With the above definition, the first area ratio A, the second area ratio B and the third area ratio C provide the following conditions:

(1) The first area ratio A is in a range from 0.24 to 0.31, the second area ratio B is in a range from 0.24 to 0.31, and the third area ratio C is in a range from 0.23 to 0.31, meeting A=B>C.

(2) The first area ratio A is in a range from 0.24 to 0.31, the second area ratio is in a range from 0.23 to 0.31, and the third area ratio is in a range from 0.23 to 0.31, meeting A>B and A>C.

(3) The first area ratio A is in a range from 0.23 to 0.31, the second area ratio B is in a range from 0.24 to 0.31, and the third area ratio C is in a range from 0.23 to 0.31, meeting B>A and B>C.

By optimizing the area ratios for the fluid pass based on the above conditions, the torque converter according to Japanese Patent Unexamined Publication No. Heisei 11 (1999)-063149 (JP11063149) is supposed to increase the torque capacity.

BRIEF SUMMARY OF THE INVENTION

FIG. 5 shows a schematic of a torque converter. The torque converter has an outermost diameter D and a length L. In an axial direction of a vehicle, the length L is defined as a length between a forward end (left in FIG. 5) of a pump impeller and a rearward end (right in FIG. 5) of a turbine runner. An ellipticity L/D of the torque converter is defined as the length L divided by the outermost diameter D.

For improving mountability of the torque converter on the vehicle, the torque converter tends to be more compact, thus decreasing the length L. In this case, however, the ellipticity L/D becoming smaller (namely, the length L becoming smaller relative to the outermost diameter D) may cause the following:

i) A curvature of each of a core of an outlet of the pump impeller and a core of an inlet of the turbine runner becomes great, thus causing a peel to the fluid flow, resulting in a lowered efficiency.

ii) The thus caused peel of the fluid flow may reduce an effective fluid pass area. Thereby, enlarging the outlet of the pump impeller and the inlet of the turbine runner may not contribute to increase in the fluid, thus failing to increase the torque capacity factor.

It is an object of the present invention to provide a torque converter having a small ellipticity.

It is another object of the present invention to provide such a proper area ratio for a fluid pass of the torque converter as to cause a proper torque capacity.

According to an aspect of the present invention, there is provided a torque converter defining an ellipticity lower than or equal to 0.23 which is an outermost length of the torque converter in an axial direction, divided by an outermost diameter of the torque converter in a radial direction. The torque converter comprises:

1) a pump impeller connecting to an input shaft;
2) a turbine runner opposed to the pump impeller and connecting to an output shaft; and
3) a stator disposed between an inlet of the pump impeller and an outlet of the turbine runner, by way of a one way clutch which allows a one way rotation.

The torque converter transmits a power by circulating a fluid through the pump impeller, the turbine runner and the stator.

When a first area ratio A, a second area ratio B and a third area ratio C are respectively defined as follows:

A. at least one of the following:
  a) a fluid pass area of the outlet of the turbine runner, divided by an area of a circle defined by the outermost diameter of any one of the pump impeller and the turbine runner, and
  b) a fluid pass area of an inlet of the stator, divided by the area of the circle defined by the outermost diameter of the any one of the pump impeller and the turbine runner, B. at least one of the following:
  a) a fluid pass area of an outlet of the stator, divided by the area of the circle defined by the outermost diameter of the any one of the pump impeller and the turbine runner, and
  b) a fluid pass area of the inlet of the pump impeller, divided by the area of the circle defined by the outermost diameter of the any one of the pump impeller and the turbine runner, and C. at least one of the following:
  a) a fluid pass area of an outlet of the pump impeller, divided by the area of the circle defined by the outermost diameter of the any one of the pump impeller and the turbine runner,
  b) and a fluid pass area of an inlet of the turbine runner, divided by the area of the circle defined by the outermost diameter of the any one of the pump impeller and the turbine runner, the first area ratio A is in a following first range:

$$0.23 \leq A \leq 0.45,$$

the second area ratio B is in a following second range:

$$0.23 \leq B \leq 0.45, \text{ and}$$

the third area ratio C is in a following third range:

$$0.15 \leq C < 0.23.$$

The other objects and features of the present invention will become understood from the following description with reference to the accompanying drawings.

BRIEF DESCRIPTION OF THE SEVERAL VIEWS OF THE DRAWINGS

FIG. 2(a) shows a schematic of a torque converter, according to a prior art using a conventional area ratio, while

DETAILED DESCRIPTION OF THE EMBODIMENTS

In the following, a certain embodiment of the present invention will be described in detail with reference to the accompanying drawings.

For ease of understanding, the following description will contain various directional terms, such as, left, right, upper, lower, forward, rearward and the like. However, such terms are to be understood with respect to only a drawing or drawings on which the corresponding part of element is illustrated.

Figure 1:
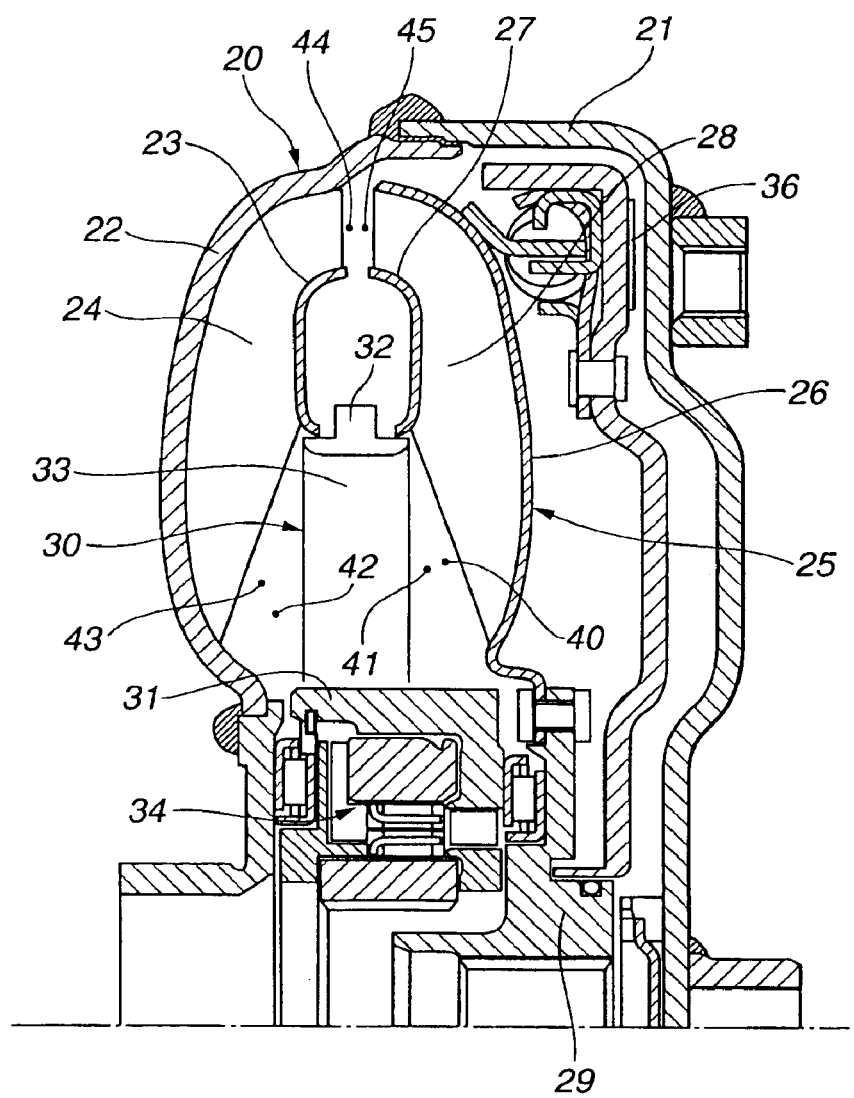
FIG. 1 is a cross section of a torque converter, according to an embodiment of the present invention.

FIG. 1 shows a cross section of a torque coverter, according to an embodiment of the present invention.

There is provided a pump impeller 20 connected to an engine (not shown in FIG. 1) by way of a casing 21. The pump impeller 20 has the following construction. A shell 22 (fixed to the casing 21) and a core 23 (of the pump impeller 20) are so formed as to define an operation fluid pass by way of a blade 24.

There is provided a turbine runner 25 opposed to the pump impeller 20. The turbine runner 25 has the following construction. A shell 26 and a core 27 (of the turbine runner 25) are so formed as to define an operation fluid pass by way of a blade 28.

The turbine runner 25 connects to an input shaft (not shown in FIG. 1) of a transmission (not shown in FIG. 1) by way of an inner race 29.

There is provided a stator 30 interposed between the pump impeller 20 and the turbine runner 25. The stator 30 has the following construction. A plurality of vanes 33 are arranged between an inner ring 31 and an outer ring 32 (core ring), in such a manner that the stator 30 can be supported to a predetermined rigid shaft (not shown in FIG. 1) by way of a one way clutch 34 which is rotatable only in one direction.

Moreover, there is provided a lock up clutch 36 between the shell 26 (of the turbine runner 25) and the casing 21. The lock up clutch 36 is disconnectable.

An outlet 40 of the turbine runner 25 has an operation fluid pass area (ratio) which is the same as that of an inlet 41 of the stator 30. An outlet 42 of the stator 30 has an operation fluid pass area (ratio) which is the same as that of an inlet 43 of the pump impeller 20. An outlet 44 of the pump impeller 20 has an operation fluid pass area (ratio) which is the same as that of an inlet 45 of the turbine runner 25. With the above construction, the operation fluid passes between the elements, namely, the turbine runner 25, the stator 30 and the pump impeller 20 are so formed as to connect with each other smoothly.

Figure 5:
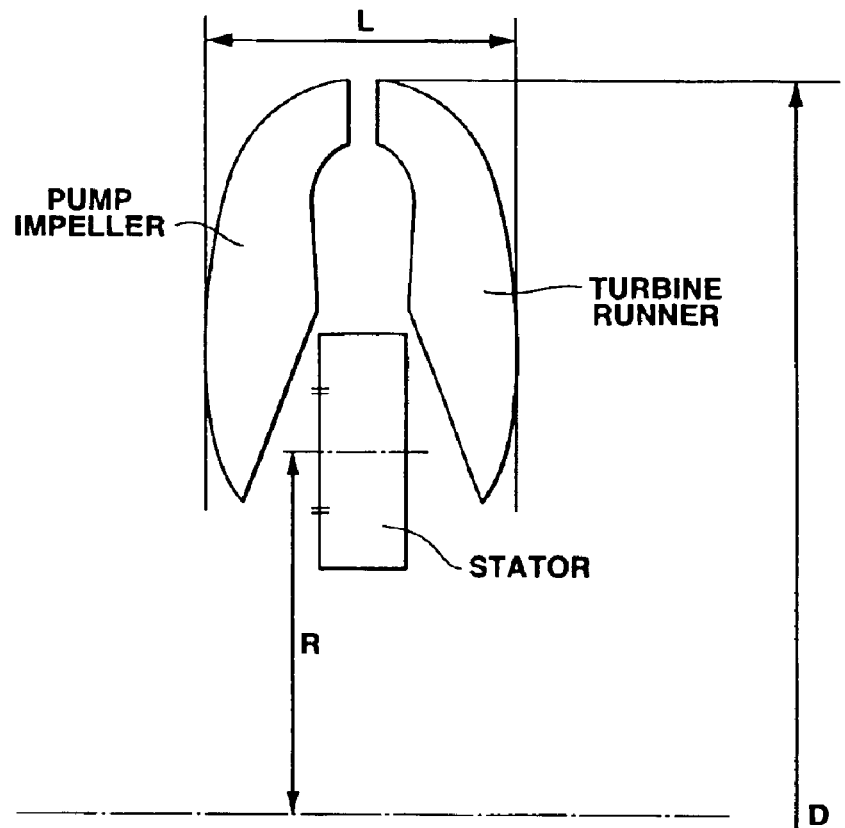
FIG. 5 shows a schematic of a torque converter.
Figure 5:
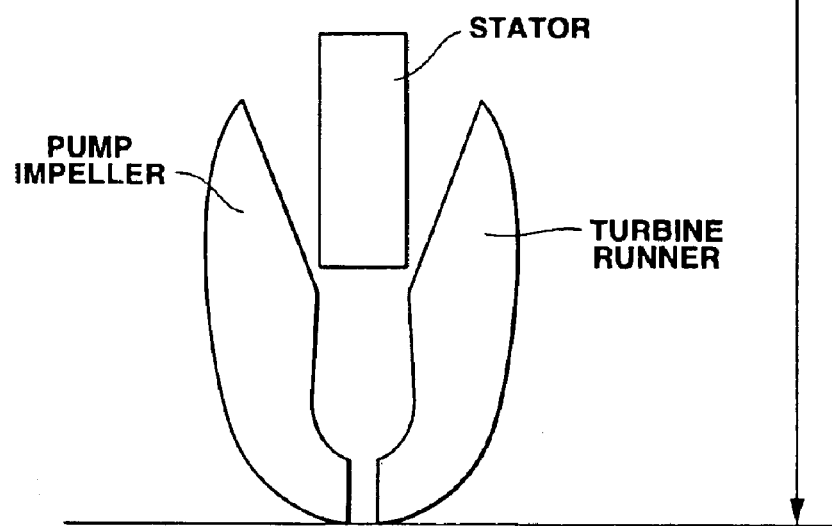

Hereinabove, the torque converter has an outer diameter, in other words, an outermost diameter D of any one of the pump impeller 20 and the turbine runner 25 which two members are the same in diameter. Moreover, the torque converter has a length L, as shown in FIG. 5. An ellipticity L/D which is defined as the length L divided by the outer diameter D is smaller than or equal to 0.23. Moreover, a first area ratio A, a second area ratio B and a third area ratio C are respectively defined as follows. (A) The first area ratio A is an operation fluid pass area of the outlet 40 of the turbine runner 25, divided by an area of a circle defined by the outermost diameter D. The first area ratio A is also an operation fluid pass area of the inlet 41 of the stator 30, divided by the area of the circle defined by the outermost diameter D. Hereinafter, the first area ratio A is, as the case may be, referred to as "stator area ratio". (B) The second area ratio B is an operation fluid pass area of the outlet 42 of the stator 30, divided by the area of the circle defined by the outermost diameter D. The second area ratio B is also an operation fluid pass area of the inlet 43 of the pump impeller 20, divided by the area of the circle defined by the outermost diameter D. Hereinafter, the second area ratio B is, as the case may be, referred to as "stator area ratio". (C) The third area ratio C is an operation fluid pass area of the outlet 44 of the pump impeller 20, divided by the area of the circle defined by the outermost diameter D. The third area ratio C is also an operation fluid pass area of the inlet 45 of the turbine runner 25, divided by the area of the circle defined by the outermost diameter D.

The torque converter has such a construction that the first area ratio A is in the following range: $0.23 \leq A \leq 0.45$, the second area ratio B is in the following range: $0.23 \leq B \leq 0.45$, and the third area ratio C is in the following range: $0.15 \leq C > 0.23$.

Figure 2A:
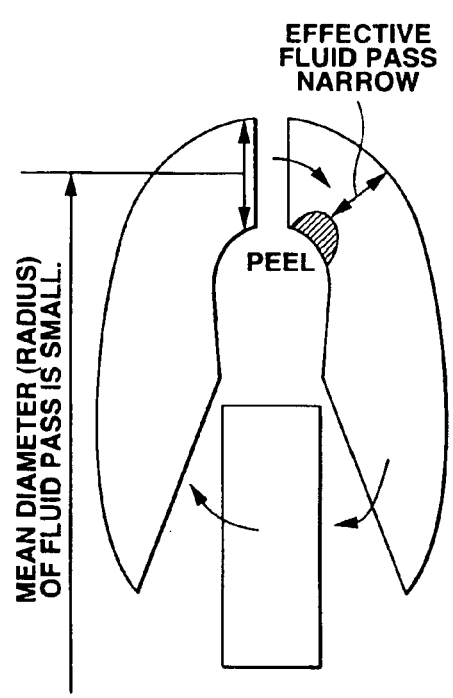
Figure 2B:
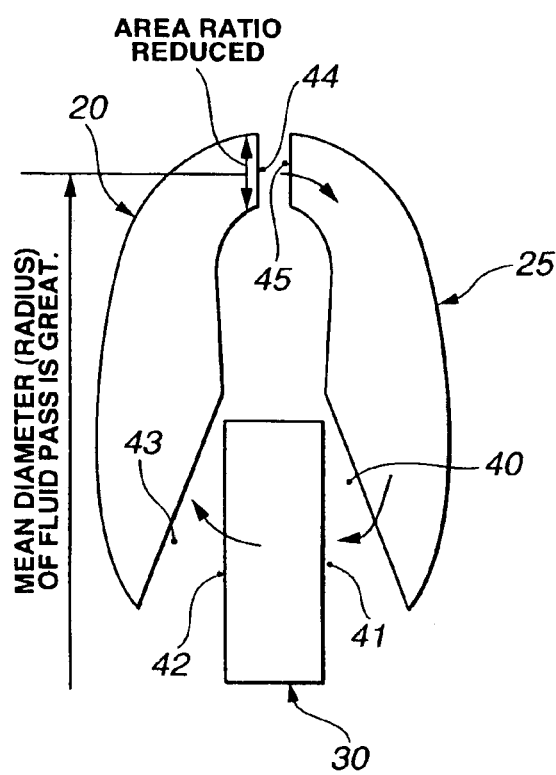
FIG. 2(b) shows a schematic of the torque converter, according to the embodiment of the present invention.

FIG. 2(a) shows a schematic of a torque converter defining a small ellipticity of lower than or equal to 0.23, according to a prior art using a conventional area ratio, while FIG. 2(b) shows a schematic of the torque converter, according to the embodiment of the present invention.

More specifically, the torque converter in FIG. 2(a) has a first area ratio A in the following range: $0.24 \leq A \leq 0.31$, a second area ratio B in the following range: $0.24 \leq B \leq 0.31$, and a third area ratio C in the following range: $0.23 \leq C > 0.31$. In addition, the first area ratio A and the second area ratio B (the same as the first area ratio A) are greater than the third area ratio C in FIG. 2(a), according to the prior art.

Compared with a mean diameter (radius) of the operation fluid pass according to the prior art in FIG. 2(a), a mean diameter (radius) of the operation fluid pass according to the embodiment of the present invention in FIG. 2(b) is greater on the outlet 44 of the pump impeller 20 and on the inlet 45 of the turbine runner 25.

According to the embodiment of the present invention, dimensions and the like of the blade 24 (see FIG. 1) and the blade 28 (see FIG. 1) can be defined in accordance with the mean diameter (radius) of the operation fluid pass.

More specifically, defining the third area ratio C in the following range: $0.15 \leq C > 0.23$ according to the embodiment of the present invention can allow the operation fluid to flow along the core 23 (of the pump impeller 20) and the core 27 (of the turbine runner 25), even when the ellipticity L/D is small and thereby a curvature becomes great. The construction of the torque converter according to the embodiment of the present invention can reduce a peel {see shaded area in FIG. 2(a)} according to the prior art. Thereby, the above construction according to the embodiment of the present invention can improve efficiency.

Moreover according to the embodiment of the present invention, an effective operation fluid pass area of each of the pump impeller 20 and the turbine runner 25 does not decrease, thus preventing reduction in quantity of the operation fluid. According to the embodiment of the present invention, the mean radius of the operation fluid pass which is rather greater than its counterpart mean radius according to the prior art can increase torque capacity factor.

With this, the torque converter even having the small ellipticity can increase the torque capacity in accordance with engine characteristic, when the torque converter according to the embodiment of the present invention is the same in outer diameter as the torque converter according to the prior art.

Described hereinafter are parameters which are of importance when designing the torque converter. The parameters can be ordered sequentially in terms of importance as follows: the efficiency, a stall torque ratio, and the torque capacity factor. (1) Efficiency (most important): The efficiency is responsible for fuel consumption. The lower the efficiency is, the more increased the fuel consumption of the vehicle is. Adjusting the efficiency by other parameters (i.e., configuration, angle and the like of the blade 24 and the blade 28) is of difficulty. Therefore, designing the torque converter is supposed to determine a way of obtaining the high efficiency (lower design limit of 85%). (2) Stall torque ratio (second most important): The stall torque ratio can greatly contribute to startability. The stall torque ratio is inversely proportional to the efficiency. More specifically, the higher the efficiency is, the more deteriorated the startability is, while the lower the efficiency is, the more improved the startability is. Hereinabove, the stall torque ratio has a lower design limit of 1.7 for operation. (3) Torque capacity factor (third most important): The higher the torque capacity factor is, the easier the tuning is. Adjusting the torque capacity factor by other parameters (i.e., configuration, angle and the like of the blade 24 and the blade 28) is possible to a certain extent, rendering the torque capacity factor to be less important. More specifically, allowing the vanes 33 (forming the outlet 42 of the stator 30) to become aligned (i.e., in parallel with) the operation fluid flow can increase the torque capacity factor to a certain extent. Moreover, varying an angle of the pump impeller 20 can vary the torque capacity factor to a certain extent.

Figure 3:
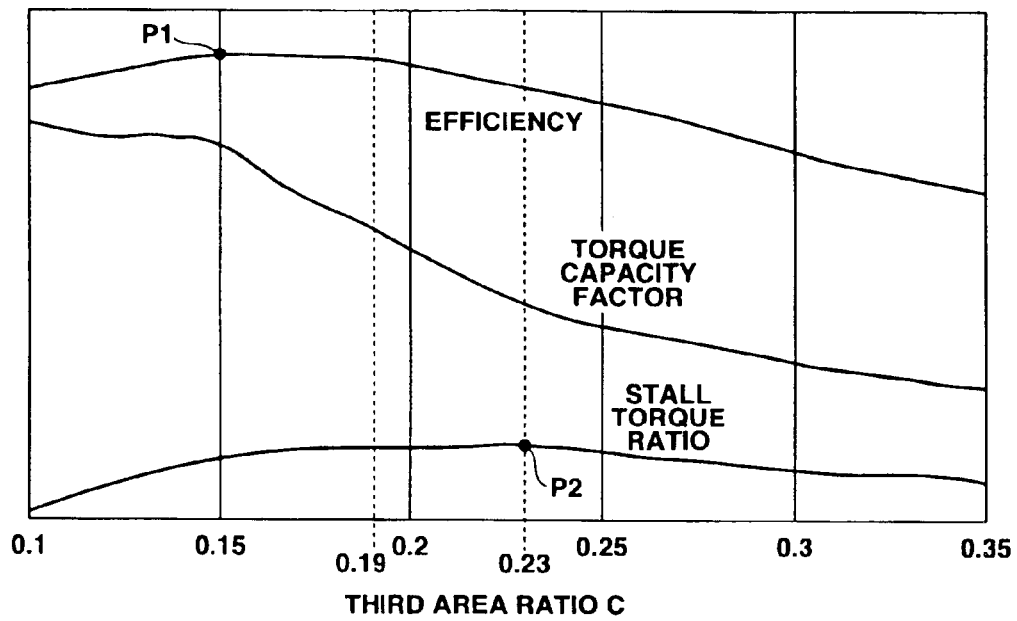
FIG. 3 shows a graph plotting an efficiency, a stall torque ratio and a torque capacity factor, relative to a third area ratio C, according to the embodiment of the present invention.

FIG. 3 shows a graph plotting the efficiency, the stall torque ratio and the torque capacity factor, relative to the third area ratio C.

(1) Efficiency

The smaller the third area ratio C is, the greater the efficiency is. This is for the following cause:

The operation fluid flowing along the core 23 (of the pump impeller 20) and the core 27 (of the turbine runner 25) can reduce the peel {see FIG. 2(a)}.

The third area ratio C becoming too small, however, may be responsible for a rapid expansion and/or reduction of the operation fluid pass, thus lowering the efficiency as plotted on a left side of a peak P1 in FIG. 3.

(2) Stall Torque Ratio

The smaller the third area ratio C is, the smaller the stall torque ratio is. This is for the following cause:

Reducing the third area ratio C increases the mean radius of the fluid pass {as can be assumed by FIG. 2(b)}, thus decreasing a stator radius ratio (see below).

Definition of the stator radius ratio:
=(Radius R)/(Mean radius of fluid pass)
For the radius R, refer to FIG. 5.

As a result, the stall torque ratio shows a decrease on a left side of a peak P2 in FIG. 3. Reducing the third area ratio C, however, may be responsible for only a minor decrease in the stall torque ratio.

(3) Torque Capacity Factor

The smaller the third area ratio C is, the greater the torque capacity factor is. This is for the following cause:

The mean radius of the operation fluid pass of the outlet 44 (of the pump impeller 20) and the inlet 45 (of the turbine runner 25) becomes great, with the quantity of the operation fluid substantially unchanged.

As a result, description of the third area ratio C can be summarized as below:

(Third Area Ratio C<0.15)

The efficiency and the torque capacity factor are high. On the other hand, the stall torque ratio is lower than the lower design limit of 1.7.

($0.15 \leq$ Third Area Ratio C<0.23)

The greater the third area ratio C is, the more reduced the efficiency is with the peak P1. The reduction in the efficiency is, however, modest, thus meeting the lower design limit of 85%. The stall torque ratio shows a modest increase, thus meeting the lower design limit of 1.7. The torque capacity factor can remain in such a range that the torque capacity factor is adjustable by other parameters (i.e., configuration, angle and the like of the blade 24 and the blade 28).
(0.23≦Third Area Ratio C)

The stall torque ratio reaches the peak P2 at the third area ratio C of 0.23. On the other hand, the efficiency reaching the peak P1 at the third area ratio C of 0.15 is reduced at the third area ratio C of 0.23 and over, thus failing to meet the lower design limit of 85%.

In sum, "0.15≦third area ratio C<0.23" is preferred.

According to the embodiment of the present invention, the third area ratio C is defined 0.19 for the following causes:

| i) | Efficiency: | Substantially the peak P1 is obtainable. |
| ii) | Stall torque ratio: | Substantially the peak P2 is obtainable. |
| iii) | Torque capacity factor: | Adjustable by other parameters (i.e., configuration, angle and the like of the blade 24 and the blade 28). |

Figure 4:
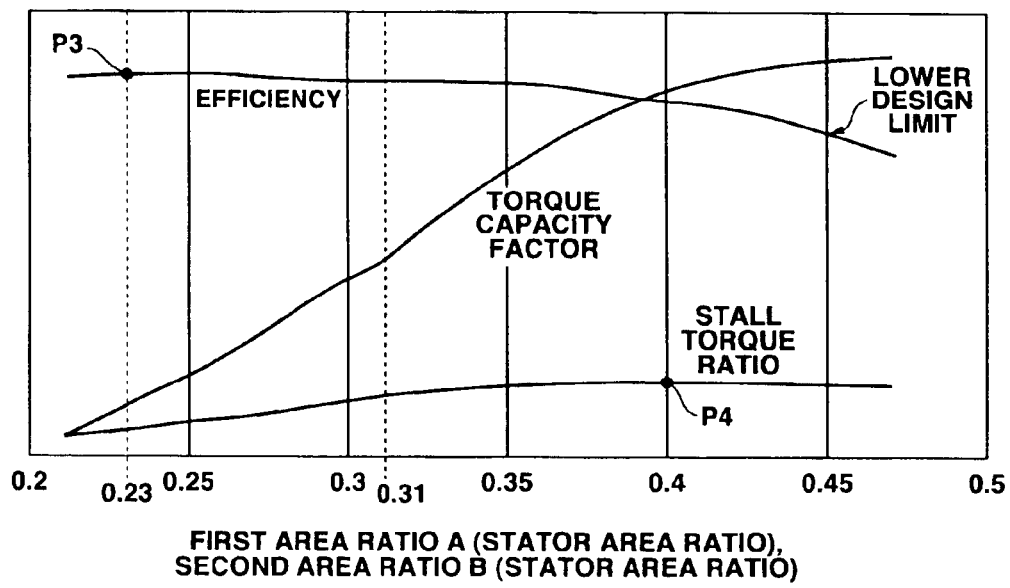
FIG. 4 shows a graph plotting the efficiency, the stall torque ratio and the torque capacity factor, relative to the first area ratio A and the second area ratio B, according to the embodiment of the present invention.

FIG. 4 shows a graph plotting the efficiency, the stall torque ratio and the torque capacity factor, relative to the first area ratio A (stator area ratio) and the second area ratio B (stator area ratio).

(1) Efficiency

The efficiency is unlikely to change in an area defined by the first area ratio A and the second area ratio B smaller than 0.4. The efficiency reduces, however, in the area defined by the first area ratio A and the second area ratio B of 0.4 or over, for the following cause:

The operation fluid pass shows the rapid expansion and/or reduction.

(2) Stall Torque Ratio

The greater the first area ratio A and the second area ratio B are, the greater the stall torque ratio is. This is for the following cause:

Increasing the first area ratio A and the second area ratio B increases the mean diameter (radius) of the operation fluid pass of the stator 30, thus increasing torque of the stator 30.

(3) Torque Capacity Factor

The greater the first area ratio A and the second area ratio B are, the greater the torque capacity factor is. This is for the following cause:

Resistance of the operation fluid pass of the stator 30 reduces and resistance of absorbing the operation fluid at the pump impeller 20 also reduces, resulting in increase in the quantity of the operation fluid.

As a result, description of the first area ratio A and the second area ratio B can be summarized as below:
(First Area Ratio A<0.23, and Second Area Ratio B<0.23)

The efficiency is high. However, the torque capacity factor is low, and the stall torque ratio is lower than the lower design limit of 1.7.
(0.23≦First Area Ratio A≦0.45, and 0.23≦Second Area Ratio B≦0.45)

With a peak P3, the efficiency reduces in accordance with an increase in the first area ratio A and the second area ratio B. The reduction in the efficiency is, however, modest, thus meeting the lower design limit of 85% with "0.23≦first area ratio A≦0.45" and "0.23≦second area ratio B≦0.45".

The stall torque ratio shows a modest increase, thus meeting the lower design limit of 1.7 with "0.23≦first area ratio A≦0.45" and "0.23≦second area ratio B≦0.45".

Moreover, the torque capacity factor can remain in such a range that the torque capacity factor is adjustable by other parameters (i.e., configuration, angle and the like of the blade 24 and the blade 28).
(0.45<First Area Ratio A, and 0.45<Second Area Ratio B)

The stall torque ratio is on the increase, otherwise as great as a peak P4. The torque capacity factor is also on the increase, otherwise as great as its peak (not shown in FIG. 4). On the other hand, the efficiency reduces, thus failing to meet the lower design limit of 85%.

In sum, "0.23≦first area ratio A≦0.45" and "0.23≦second area ratio B≦0.45" are preferred.

According to the embodiment of the present invention, each of the first area ratio A and the second area ratio B is defined 0.31 for the following causes:

| i) | Efficiency: | Substantially the peak P3 is obtainable. |
| ii) | Stall torque ratio: | Substantially the peak P4 is obtainable. |
| iii) | Torque capacity factor: | Adjustable by other parameters (i.e., configuration, angle and the like of the blade 24 and the blade 28). |

In sum, the torque converter according to the embodiment of the present invention has the ellipticity L/D smaller than or equal to 0.23 which contributes to compactness of the torque converter. More specifically, the ellipticity L/D is defined 0.19. Moreover, the torque converter according to the embodiment of the present invention has the first area ratio A of 0.31, the second area ratio B of 0.31 and the third area ratio of 0.19, thus preferably balancing the parameters including the efficiency, the stall torque ratio and the torque capacity factor.

Although the present invention has been described above by reference to the certain embodiment, the present invention is not limited to the embodiment described above. Modifications and variations of the embodiments described above will occur to those skilled in the art, in light of the above teachings.

This application is based on a prior Japanese Patent Application No. P2001-395185 (filed on Dec. 26, 2001 in Japan). The entire contents of the Japanese Patent Application No. P2001-395185 from which priority is claimed is incorporated herein by reference, in order to take some protection against mis-translation or omitted portions.

The scope of the present invention is defined with reference to the following claims.

What is claimed is:

1. A torque converter comprising:
   1) a pump impeller connecting to an input shaft;
   2) a turbine runner opposed to the pump impeller and connecting to an output shaft; and
   3) a stator disposed between an inlet of the pump impeller and an outlet of the turbine runner, by way of a one way clutch which allows a one way rotation, wherein the torque converter is configured to transmit a power by circulating a fluid through the pump impeller, the turbine runner and the stator, wherein the torque converter defines an ellipticity, which is an outermost length of the torque converter in an axial direction divided by an outermost diameter of the torque converter in a radial direction, wherein the ellipticity is ≦0.23, and wherein when a first area ratio A, a second area ratio B and a third area ratio C are respectively defined as follows:

A. at least one of the following:
  a) a fluid pass area of the outlet of the turbine runner, divided by an area of a circle defined by the outermost diameter of any one of the pump impeller and the turbine runner, or
  b) a fluid pass area of an inlet of the stator, divided by the area of the circle defined by the outermost diameter of the any one of the pump impeller and the turbine runner,
B. at least one of the following:
  a) a fluid pass area of an outlet of the stator, divided by the area of the circle defined by the outermost diameter of the any one of the pump impeller and the turbine runner, or
  b) a fluid pass area of the inlet of the pump impeller, divided by the area of the circle defined by the outermost diameter of the any one of the pump impeller and the turbine runner, and
C. at least one of the following:
  a) a fluid pass area of an outlet of the pump impeller, divided by the area of the circle defined by the outermost diameter of the any one of the pump impeller and the turbine runner, or
  b) a fluid pass area of an inlet of the turbine runner, divided by the area of the circle defined by the outermost diameter of the any one of the pump impeller and the turbine runner, the first area ratio A is in a following first range: $0.23 < A \leq 0.45$, the second area ratio B is in a following second range: $0.23 < B \leq 0.45$, and the third area ratio C is in a following third range: $0.15 \leq C < 0.23$.

2. The torque converter as claimed in claim 1, wherein the first area ratio A and the second area ratio B are substantially equal to each other, and wherein the first area ratio A and the second area ratio B are greater than the third area ratio C.

3. The torque converter as claimed in claim 1, wherein when the third area ratio C is in the following third range: $0.15 \leq C < 0.23$,
  1) an efficiency of the torque converter is at least 85%,
  2) a stall torque ratio of the torque converter is at least 1.7, and
  3) a torque capacity factor of the torque converter is in such a range that the torque capacity factor is adjustable by a blade of the pump impeller and a blade of the turbine runner.

4. The torque converter as claimed in claim 3, wherein the third area ratio C is 0.19.

5. The torque converter as claimed in claim 1, wherein when the first area ratio A and the second area ratio B are respectively in the following first range and the following second range: $0.23 < A \leq 0.45$, and $0.23 < B \leq 0.45$,
  1) an efficiency of the torque converter is at least 85%,
  2) a stall torque ratio of the torque converter is at least 1.7, and
  3) a torque capacity factor of the torque converter is in such a range that the torque capacity factor is adjustable by a blade of the pump impeller and a blade of the turbine runner.

6. The torque converter as claimed in claim 1, wherein the ellipticity of the torque converter is 0.19.

7. A torque converter comprising:
  1) a pump impeller connecting to an input shaft;
  2) a turbine runner opposed to the pump impeller and connecting to an output shaft; and
  3) a stator disposed between an inlet of the pump impeller and an outlet of the turbine runner, by way of a one way clutch which allows a one way rotation, wherein the torque converter is configured to transmit a power by circulating a fluid through the pump impeller, the turbine runner and the stator, wherein the torque converter defines an ellipticity, which is an outermost length of the torque converter in an axial direction divided by an outermost diameter of the torque converter in a radial direction, the torque converter, wherein the ellipticity is $\leq 0.23$, wherein when a first area ratio A, a second area ratio B and a third area ratio C are respectively defined as follows:
  A. at least one of the following:
    a) a fluid pass area of the outlet of the turbine runner, divided by an area of a circle defined by the outermost diameter of any one of the pump impeller and the turbine runner, or
    b) a fluid pass area of an inlet of the stator, divided by the area of the circle defined by the outermost diameter of the any one of the pump impeller and the turbine runner,
  B. at least one of the following:
    a) a fluid pass area of an outlet of the stator, divided by the area of the circle defined by the outermost diameter of the any one of the pump impeller and the turbine runner, or
    b) a fluid pass area of the inlet of the pump impeller, divided by the area of the circle defined by the outermost diameter of the any one of the pump impeller and the turbine runner, and
  C. at least one of the following:
    a) a fluid pass area of an outlet of the pump impeller, divided by the area of the circle defined by the outermost diameter of the any one of the pump impeller and the turbine runner, or
    b) a fluid pass area of an inlet of the turbine runner, divided by the area of the circle defined by the outermost diameter of the any one of the pump impeller and the turbine runner, wherein the first area ratio A is 0.31, wherein the second area ratio B is 0.31, wherein the third area ratio C is in a following third range: $0.15 \leq C < 0.23$, wherein an efficiency of the torque converter is at least 85%, wherein a stall torque ratio of the torque converter is at least 1.7, and wherein a torque capacity factor of the torque converter is in such a range that the torque capacity factor is adjustable by a blade of the pump impeller and a blade of the turbine runner.

8. A torque converter comprising:
a pump impeller connecting to an input shaft;
a turbine runner opposed to the pump impeller and connecting to an output shaft; and
a stator disposed between an inlet of the pump impeller and an outlet of the turbine runner, by way of a one way clutch which allows a one way rotation, wherein the torque converter is configured to transmit a power by circulating a fluid through the pump impeller, the turbine runner and the stator, wherein torque converter defines an ellipticity, which is an outermost length of the torque converter in an axial direction divided by an outermost diameter of the torque converter in a radial direction, and wherein the ellipticity is ≦0.23, wherein a first area ratio A, which is in a following first range: 0.23<A≦0.45, is at least one of the following:
   a) a fluid pass area of the outlet of the turbine runner, divided by an area of a circle defined by the outermost diameter of any one of the pump impeller and the turbine runner, or
   b) a fluid pass area of an inlet of the stator, divided by the area of the circle defined by the outermost diameter of the any one of the pump impeller and the turbine runner, wherein a second area ratio B, which is in a following second range: 0.23<B≦0.45, is at least one of the following:
   a) a fluid pass area of an outlet of the stator, divided by the area of the circle defined by the outermost diameter of the any one of the pump impeller and the turbine runner, or
   b) a fluid pass area of the inlet of the pump impeller, divided by the area of the circle defined by the outermost diameter of the any one of the pump impeller and the turbine runner, and wherein a third area ratio C, which is in a following third range: 0.15≦C<0.23, is at least one of the following:
   a) a fluid pass area of an outlet of the pump impeller, divided by the area of the circle defined by the outermost diameter of the any one of the pump impeller and the turbine runner, or
   b) a fluid pass area of an inlet of the turbine runner, divided by the area of the circle defined by the outermost diameter of the any one of the pump impeller and the turbine runner.

9. The torque converter as claimed in claim 8, wherein an efficiency of the torque converter is at least 85%, wherein a stall torque ratio of the torque converter is at least 1.7, and wherein a torque capacity factor of the torque converter is in such a range that the torque capacity factor is adjustable by a blade of the pump impeller and a blade of the turbine runner.

10. The torque converter as claimed in claim 8, wherein the first area ratio A and the second area ratio B are substantially equal to each other.

11. The torque converter as claimed in claim 10, wherein the first area ratio A is about 0.31, and wherein the second area ratio B is about 0.31.

12. The torque converter as claimed in claim 8, wherein the third area ratio C is about 0.19.

13. The torque converter as claimed in claim 8, wherein the first area ratio A and the second area ratio B are greater than the third area ratio C.

14. The torque converter as claimed in claim 8, wherein the ellipticity of the torque converter is about 0.19.

15. A torque converter comprising:

a pump impeller connecting to an input shaft;

a turbine runner opposed to the pump impeller and connecting to an output shaft; and a stator disposed between an inlet of the pump impeller and an outlet of the turbine runner, by way of a one way clutch which allows a one way rotation, wherein the torque converter is configured to transmit a power by circulating a fluid through the pump impeller, the turbine runner and the stator, wherein torque converter defines an ellipticity, which is an outermost length of the torque converter in an axial direction divided by an outermost diameter of the torque converter in a radial direction, wherein the ellipticity is ≦0.23, and wherein when a first area ratio A is at least one of the following:
   a) a fluid pass area of the outlet of the turbine runner, divided by an area of a circle defined by the outermost diameter of any one of the pump impeller and the turbine runner, or
   b) a fluid pass area of an inlet of the stator, divided by the area of the circle defined by the outermost diameter of the any one of the pump impeller and the turbine runner, and when a second area ratio B is at least one of the following:
   a) a fluid pass area of an outlet of the stator, divided by the area of the circle defined by the outermost diameter of the any one of the pump impeller and the turbine runner, or
   b) a fluid pass area of the inlet of the pump impeller, divided by the area of the circle defined by the outermost diameter of the any one of the pump impeller and the turbine runner, and and when a third area ratio C is at least one of the following:
   a) a fluid pass area of an outlet of the pump impeller, divided by the area of the circle defined by the outermost diameter of the any one of the pump impeller and the turbine runner, or
   b) a fluid pass area of an inlet of the turbine runner, divided by the area of the circle defined by the outermost diameter of the any one of the pump impeller and the turbine runner, the first area ratio A is in a following first range: 0.23<A≦0.45, the second area ratio B is in a following second range: 0.23<B≦0.45, and the third area ratio C is in a following third range: 0.15≦C<0.23.

16. The torque converter as claimed in claim 15, wherein the first area ratio A and the second area ratio B are substantially equal to each other.

17. The torque converter as claimed in claim 15, wherein an efficiency of the torque converter is at least 85%, wherein a stall torque ratio of the torque converter is at least 1.7, and wherein a torque capacity factor of the torque converter is in such a range that the torque capacity factor is adjustable by a blade of the pump impeller and a blade of the turbine runner.

18. The torque converter as claimed in claim 15, wherein the first area ratio A is about 0.31, and wherein the second area ratio B is about 0.31.

19. The torque converter as claimed in claim 15, wherein the ellipticity of the torque converter is about 0.19.

20. The torque converter as claimed in claim 15, wherein the first area ratio A and the second area ratio B are substantially equal to each other.

* * * * *